(12) United States Patent
Mathew et al.

(10) Patent No.: US 12,182,289 B2
(45) Date of Patent: Dec. 31, 2024

(54) FENCING OFF CLUSTER SERVICES BASED ON ACCESS KEYS FOR SHARED STORAGE

(71) Applicant: Dell Products L.P., Round Rock, TX (US)

(72) Inventors: George Mathew, Belmont, CA (US); Abhinav Duggal, Fremont, CA (US); Senthil Ponnuswamy, San Jose, CA (US); Mahadev Karadigudda, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 17/854,318

(22) Filed: Jun. 30, 2022

(65) Prior Publication Data
US 2024/0005017 A1    Jan. 4, 2024

(51) Int. Cl.
G06F 21/62    (2013.01)
G06F 9/50    (2006.01)
(Continued)

(52) U.S. Cl.
CPC ........ G06F 21/6218 (2013.01); G06F 9/5072 (2013.01); G06F 21/44 (2013.01);
(Continued)

(58) Field of Classification Search
CPC .... G06F 9/5072; G06F 21/5072; G06F 21/64; G06F 21/44; G06F 21/604; G06F 21/6218
See application file for complete search history.

(56) References Cited

U.S. PATENT DOCUMENTS 7,168,088 B1 *  1/2007  Matena ............... G06F 11/2033
                                              709/219
10,567,359 B2 *  2/2020  Harnik .................. H04L 63/061
(Continued)

OTHER PUBLICATIONS

"Why Do I Have to Use Access Key and Secret Key for Cluster Member Discovery"—Git Hub, Hazelcast-AWS, Oct. 18, 2017 https://github.com/hazelcast/hazelcast-aws/issues/46 (Year: 2017).*
(Continued)

*Primary Examiner* — Randy A Scott
(74) *Attorney, Agent, or Firm* — Dergosits & Noah LLP; Todd A. Noah

(57) ABSTRACT

A fencing service receives a cluster message based on a first service's removal from membership in a first node in a cluster, and generates an access key based on a generation identifier in the cluster message. The fencing service sends the access key to a shared storage, thereby enabling the shared storage to create signing keys based on the access key, and which are used to validate signed requests to access resources stored by the shared storage. A second service in a second node in the cluster receives the cluster message, and generates the access key based on the generation identifier. The second service accesses a resource previously accessed by the first service, by generating a signing key based on the access key and a request to access the resource stored by the shared storage, and then sending the request signed by the signing key to the shared storage.

17 Claims, 6 Drawing Sheets

(51) Int. Cl.
   *G06F 21/44* (2013.01)
   *G06F 21/60* (2013.01)
   *G06F 21/64* (2013.01)
(52) U.S. Cl.
   CPC ............ *G06F 21/604* (2013.01); *G06F 21/64* (2013.01); *G06F 2221/2103* (2013.01); *G06F 2221/2113* (2013.01); *G06F 2221/2141* (2013.01)

(56) References Cited

U.S. PATENT DOCUMENTS

2019/0215164 A1* 7/2019 Hamann ............... H04L 9/0894
2020/0145203 A1* 5/2020 Sun ....................... H04L 9/0836
2022/0391523 A1* 12/2022 Kwong ............... G06F 21/6218

OTHER PUBLICATIONS

"Remove a Cluster Member"—Splunk Enterprise, Jan. 3, 2022 https://docs.splunk.com/Documentation/Splunk/9.3.0/DistSearch/Removeaclustermember (Year: 2022).*

* cited by examiner

FENCING OFF CLUSTER SERVICES BASED ON ACCESS KEYS FOR SHARED STORAGE

TECHNICAL FIELD

This disclosure relates to storing digital information, and more particularly, to fencing off cluster services based on access keys for shared storage.

BACKGROUND

A data user may copy data in a data center to one or more remote sites, which may be in one or more cloud locations, to have copies of data in case of a data center disaster, and/or the data user may copy data from remote sites to a centralized data center. Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) file attachment, a data storage system may store all 100 instances of the same 1 MB file attachment, inefficiently using 100 MB of storage space to store the same 1 MB file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB file attachment and stores small references to the one stored instance for the 99 subsequent instances.

When being copied from or to a data storage system, a data file or a data object may be divided into data segments. A data deduplication system can receive data segments, compare these received data segments against previously stored data segments, identify which received data segments are unique because they have not been previously stored, and store the unique data segments. When a comparison identifies a received data segment as a duplicate of a data segment that has previously been stored as unique, a data deduplication system replaces the duplicate data segment with a small reference that points to the previously stored data segment.

A deduplication system typically does not determine whether a data segment is a duplicate data segment or a unique data segment by directly comparing this data segment against previously stored data segments which were previously determined to be unique data segments. For example, a deduplication system would waste system resources by directly comparing thousands of bytes in each of many data segments which were formed from a client's data object or data file against thousands of bytes in millions of data segments which have already been identified and stored as unique data segments. Instead, a fingerprint that uniquely identifies a data segment may be generated for each data segment, such as by applying a SHA-1 hash function to create a unique 20-byte fingerprint for each data segment. Consequently, a deduplication system can conserve system resources by more efficiently comparing 20-byte fingerprints for each of many data segments formed from a client's data object or data file against 20-byte fingerprints for millions of data segments which have already been identified and stored as unique data segments.

A scale-out can be the addition of more nodes to a data storage system, such as scaling out from a system that includes one web server to a system that includes three web servers. As computer prices drop and computer performance increases, system architects can configure hundreds of small computers in a cluster to obtain aggregate computing capabilities that often exceed that of computers based on a single traditional processor. A cluster can be a set of loosely or tightly connected computers that work together so that, in many respects, they are viewed as a single system.

Unlike grid computers, a cluster has each node (a computer used as a server) set to perform the same task, controlled and scheduled by software. The components of a cluster are usually connected to each other through fast local area networks, with each node running its own instance of an operating system. In most circumstances, all of the nodes use the same type of hardware and the same type of operating system. Clusters are usually deployed to improve performance and availability over that of a single computer, while typically being more cost-effective than single computers of comparable speed or availability.

In a cluster of nodes, such as the cluster 100 of the nodes 101, 102, and 103, there should be one resource owner, such as the services 111, 112, or 113, for a given resource, such as the resources 121, 122, or 123, to guarantee data consistency, such as when consistently storing the resources 121, 122, and 123 to the shared storage 130, as depicted by FIG. 1. These resources 121, 122, or 123 could be a namespace where the services 111, 112, or 113 are adding namespace objects, or a fingerprint index where the fingerprints are appended by the services 111, 112, or 113. If the cluster 100 loses the heartbeat signal from the node 103, such that the node 103 is unavailable from a cluster membership perspective via the "east-to-west" communication network between cluster nodes, clients may still be able to write to the node 103 via the "north-to-south" communication network between cluster nodes and clients. After determining that the node 103 is unable to confirm communication with the cluster 100, a cluster membership service, which may be hosted by the cluster 100, may move the ownership of the resource 123 to the node 101 to enable the cluster 100 to maintain availability of the resource 123.

For data consistency purposes, there can be only one owner for the resource 123, such that the cluster 100 needs to ensure that the node 101 can start writing to the resource 123, but the cluster 100 cannot communicate with the node 103 to ensure the node 103 will have stopped writing to the resource 123. Therefore, the cluster 100 needs to ensure that there is only a single owner for each resource, such that the shared storage 130 that stores the resource 123 only accepts writes from the node 101 to the resource 123 and no longer accepts writes from the node 103 to the resource 123. On traditional data storage systems, where the Small Computer System Interface (SCSI) protocol is visible to cluster nodes, SCSI reservations may be used to "fence off" or restrict the input and the output for any node, but such fencing off of cluster components is unavailable for scaled out systems, such as object storage used by cloud storage platforms.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
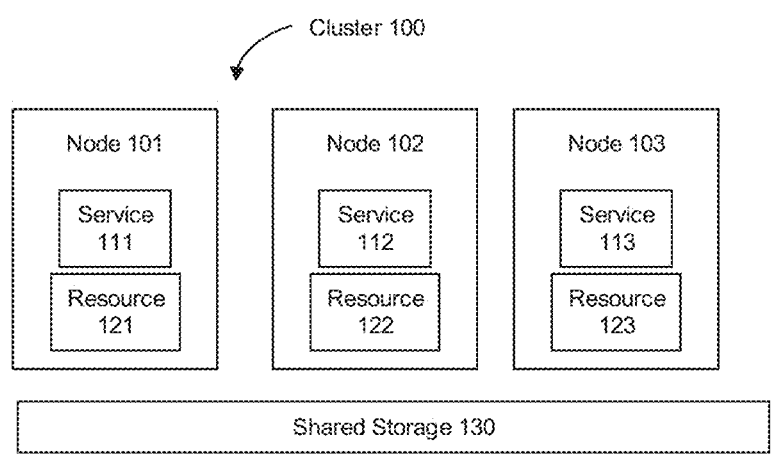
FIG. 1 is a block diagram illustrating a cluster of nodes, according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

In some embodiments, a system (and a computer program product and a method) is described for fencing off cluster services based on access keys for shared storage. A fencing service receives a cluster message based on a removal of a first service from membership in a first node in a cluster, and generates an access key based on a generation identifier in the cluster message. The fencing service sends the access key to a shared storage, thereby enabling the shared storage to create signing keys which are based on the access key, and which are used to validate signed requests to access resources stored by the shared storage. A resource may be relocated from the first node to a second node, in response to the first service in the first node being removed from membership in the cluster. A second service in the second node in the cluster receives the cluster message, and generates the access key based on the generation identifier. The second service accesses a resource previously accessed by the first service, by generating a signing key based on the access key and a request to access the resource stored by the shared storage, and then sending the request signed by the signing key to the shared storage.

For example, a fencing service receives a cluster membership message, which includes a generation identifier of "10," and which was created for the removal of a deduplication and compression service from membership in a cluster of nodes, and then inputs the generation identifier of "10" into a password-based key derivation function to generate a new secret access key. Then the fencing service sends the new secret access key to the object storage, which uses the new secret access key to create the signing keys used to validate signed requests to access resources stored by the object storage. A cluster membership service can relocate a local post-deduplication log, which was accessed by the deduplication and compression service removed from cluster membership, from a node which is not communicating with the cluster to another node in the cluster which is still communicating with the cluster. Another deduplication and compression service in the other node in the cluster receives the cluster membership message, and uses the generation identifier of "10" to generate the new secret access key. Then the other deduplication and compression service uses the new secret access key and a request to access the local post-deduplication log stored by the object storage to generate a signing key, sends the request signed by the signing key to the object storage, and accesses the local post-deduplication log which belonged to the deduplication and compression service which was removed from cluster membership.

In some embodiments, such a system may be provided within an operating environment. An example of such an operating environment is further described herein with reference to FIG. 2. However, in general, embodiments of the disclosure may include and/or be implemented in an operating environment that includes a services orchestration environment, and that may include a data protection operating environment which includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the services orchestration environment may take the form of a cloud environment. However, in some embodiments the services orchestration environment may be implemented in an on-premises environment, and/or hybrid environments that include public and private elements. In addition, the services orchestration environment and/or operating environment may take the form of an environment that is partly, or completely, virtualized. The operating environment may include one or more host devices that each host one or more applications used by a client in the operating environments.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

Figure 2:
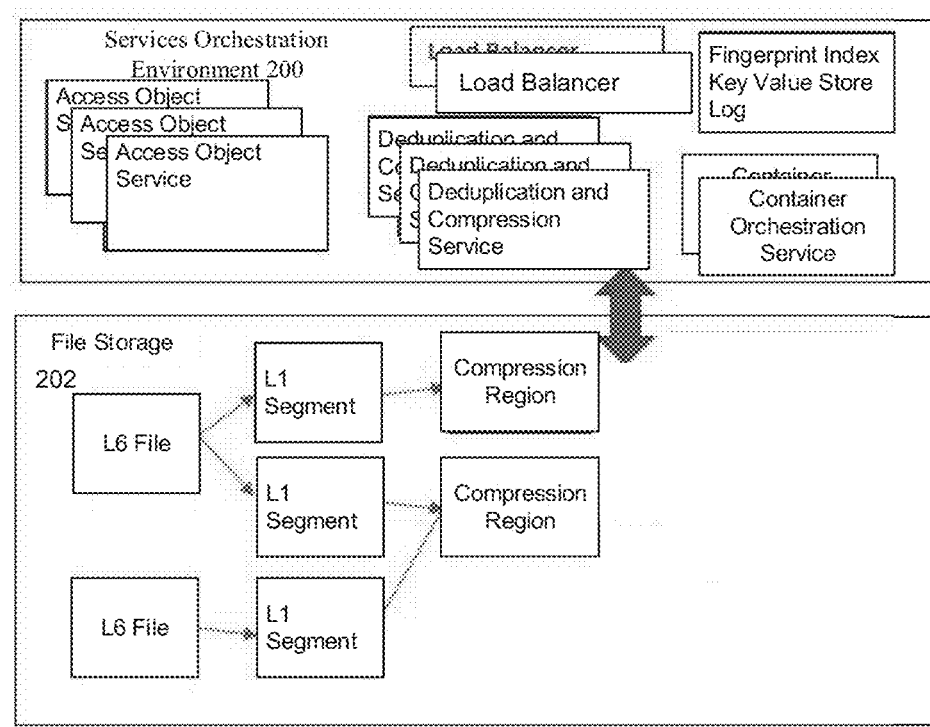
FIG. 2 is a block diagram illustrating parts of an example operating environment for fencing off cluster services based on access keys for shared storage, according to one or more embodiments of the disclosure.

As shown in FIG. 2, the services orchestration environment 200 (such as a Kubernetes cloud computing environment) may provide for the deployment of distinct types of services. The services orchestration environment 200 may enable the deployment of services for fencing off cluster services based on access keys for shared storage, and for conditional storage in the file storage 202 or the object storage 202.

Although originally designed for Amazon Web Services (AWS), many cloud storage platforms use the S3 Application Programming Interface (API), which is an object storage service that offers industry-leading scalability, data availability, security, and performance. The S3 API is used as a security key-based authentication mechanism to authenticate requests to access resources. Each request to access resources has an access key identifier (id), and each access key id has a secret access key.

The client-side uses the secret access key, the access key id, and a set of other strings as part of a request to access a resource to generate a signature for the request to access the resource, uses the signature to sign the request to access the resource, and sends the signed request to the server-side. The server-side uses a previously received secret access key and the signed request to generate the request's expected signature, which is used to validate the request's actual signature. If the signature of the request to access the resource does not match the server-side's expected signature, the server-side denies the client-side's request to access the resource.

Figure 3:
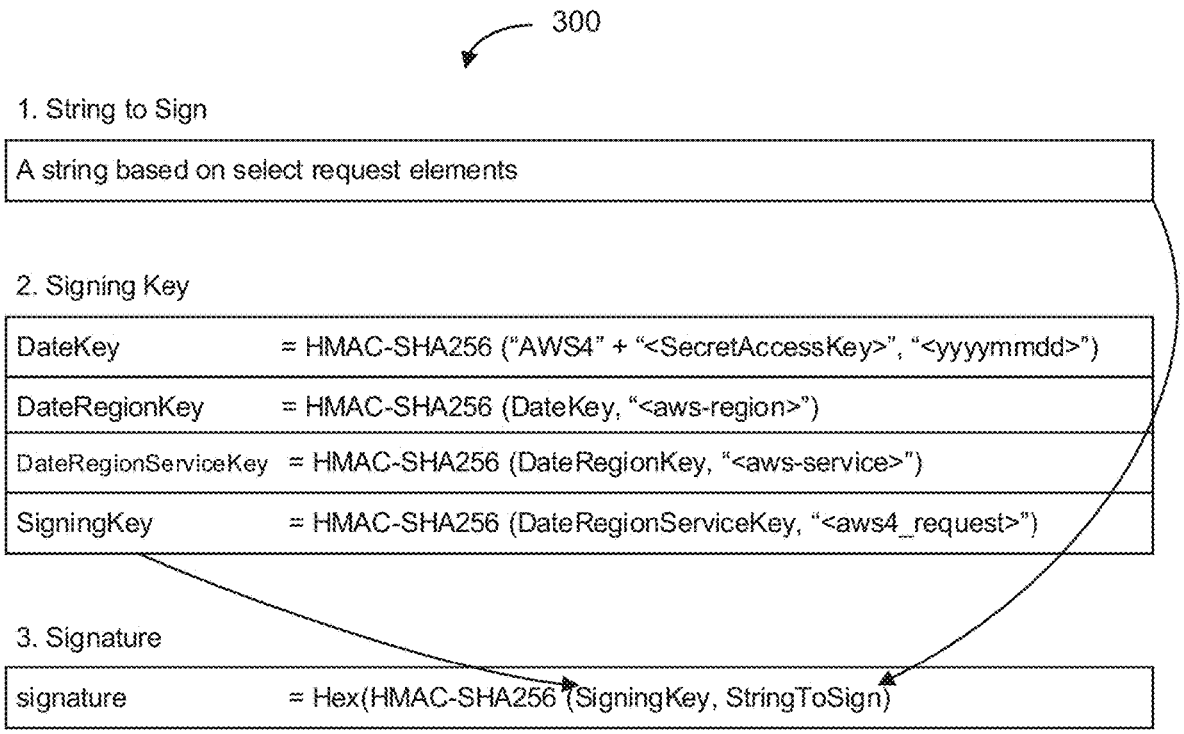
FIG. 3 depicts block diagrams illustrating the generation of signing keys for accessing resources stored on shared storage.

FIG. 3 depicts block diagrams illustrating the generation of signing keys for accessing resources stored by shared storage. As depicted by the equations 300, the S3 API hashes a date and a secret access key to generate a date key, hashes the date key and a region to generate a date-region key, hashes the date-region key and a service to generate a date-region-service key, and then hashes the date-region-service key and a request to generate a signing key. Then the signing key and the string to sign are hashed to generate the signature for a signed string which is a request to access a resource.

Some data storage systems have a cluster membership service or module that monitors cluster membership events from container orchestration services and delivers information about the cluster membership events to a set of subscribers in a hierarchical order. The cluster membership service assigns a unique generation identifier, number, or count to every cluster membership event. Then the cluster membership service delivers the cluster membership messages to only the cluster services that are part of the current cluster membership.

The server-side, which includes a cluster membership service, sends a cluster membership message for each new cluster membership event and a new generation identifier to only the services that are in a new cluster membership list. Therefore, the cluster services the cluster membership message for any new cluster membership change event and the cluster membership message includes a new generation identifier.

Figure 4:
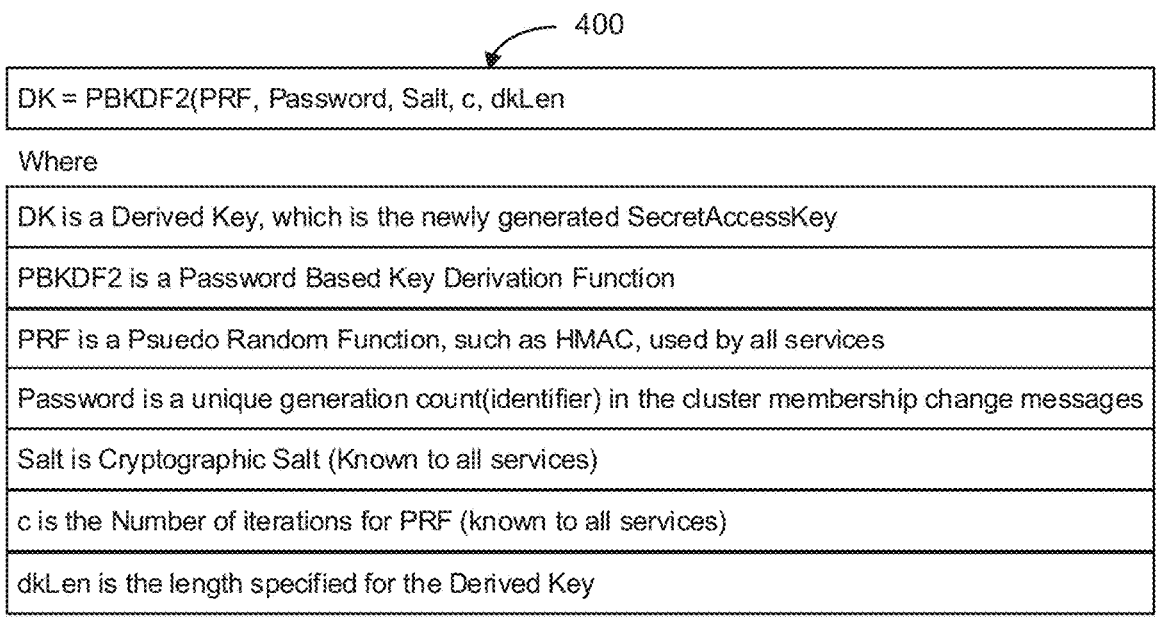
FIG. 4 depicts block diagrams illustrating the generation of secret access keys for fencing off cluster services based on access keys for shared storage, according to one or more embodiments of the disclosure.

A solution to the problem of fencing off cluster services which access resources stored by shared storage is for the server-side to use the generation identifier in the cluster membership message to generate a new secret access key. FIG. 4 depicts block diagrams illustrating an example of the generation of secret access keys for fencing off cluster services. The equation 400 depicts how any cluster service combines the generation identifier from a cluster membership message with a pseudo random function, cryptographic salt, the number of iterations for the pseudo random function, and the length specified for the derived key to generate a new secret access key, which can be used to generate signing keys which can be used to sign requests to access resources.

Figure 5:
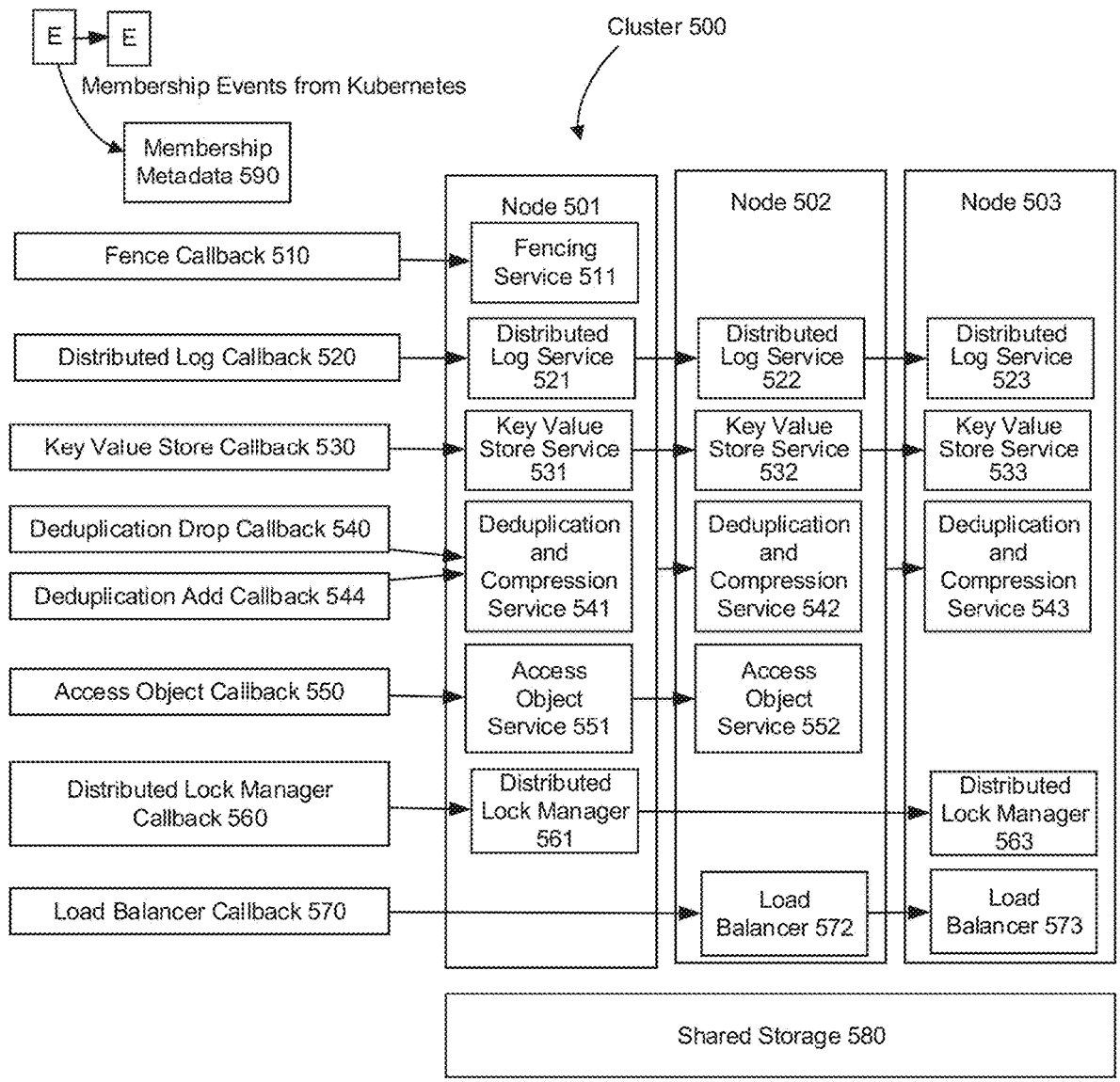
FIG. 5 is a block diagram illustrating cluster node services for fencing off cluster services based on access keys for shared storage, according to one or more embodiments of the disclosure.

FIG. 5 depicts a cluster 500 of nodes 501-503, with callbacks and their cluster services for: fencing 510 and 511; distributed logs 520, 521, 522, and 523; key value stores 530, 531, 532, and 533; deduplication and compression 540, 541, 542, 543, and 544; access objects 550, 551, and 552; distributed lock managers 560, 561, and 563; and load balancers 570, 572, and 573; listed in the order in which these services receive the cluster membership messages. FIG. 5 also depicts the shared storage 580, which may be implemented as the object storage 580, the distributed log 580, or the distributed key value store 580, and the membership metadata 590. Each cluster membership message includes an old cluster membership list, a new cluster membership list, and an assigned generation identifier. The cluster membership service sends the cluster membership message to the cluster services which have cluster membership, such as the fencing service, which may be referred to as "dd_fence," distributed log services, key value store services, deduplication and compression services, access object services, distributed lock management services, and file system redirector and proxy services, which may be referred to as load balancer services, in that order.

As depicted by FIG. 5, the first cluster service to receive the cluster membership message's information about a cluster membership event is the fencing service 511, which may be referred to as a dd_fence service if the service is associated with Dell's Data Domain. The fencing service can review the old cluster membership list and the new cluster membership list, and identify a cluster service that has a change in the cluster membership of these lists. The fencing service 511 changes the shared storage's secret access key based on the generation identifier of a cluster membership reconfiguration event. For example, when the deduplication and compression service 543 (which may be abbreviated as DC3) died, a cluster membership service identified the subsequent loss of a heartbeat communication as a cluster membership event, assigned the generation identifier of "10" to the event, and sent a cluster membership message to the cluster services, which would be similar to:

Event—{old membership={aob1, dc1, aob2, dc2, dlm1, dlm2, aob3, dc3},
new membership={aob1, dc1, aob2, dc2, dlm1, dlm2, aob3}, generation=10}.

On receiving the cluster membership message, the fencing service 511 uses the generation identifier of "10" in the cluster membership message as an input for generating a new secret access key, such as an input to the password-based key derivation function which may be represented as fx (generation identifier).

Then the fencing service 511 sends the new secret access key to the object storage 580, after which the other cluster services receive the cluster membership message. Additionally, the cluster membership service may relocate any resource which is assigned to a cluster service which no longer has cluster membership to a node which still has cluster membership. After receiving the new secret access key, the object storage 580 can use the new secret access key and data associated with any subsequent request to access a resource stored by the object storage 580 as inputs to generate a signing key, which may be specific for a cluster service and/or a node, such as any of the deduplication and compression services 541, 542, and 543.

At this point, the existing cluster services will not be able to access any resource in the object storage 580 because the fencing service 511 has the changed secret access key, but the other cluster services do not have the new secret access key yet. Eventually when the other cluster services which have cluster membership receive the cluster membership message which includes information about the corresponding reconfiguration event, and any new generation identifier, such as "10," these cluster services can input the generation identifier into a function, such as the password-based key derivation function which may be represented as fx(10), to generate a new secret access key which enables subsequent access to resources stored by the object storage 580.

However, a cluster service which has no cluster membership, or which is in a node that has no cluster membership, will not receive the new cluster membership message and will not receive the new generation identifier or the new secret access key. For example, if the third deduplication and compression service 543 (DC3) died, hanging, was partitioned off, or was detected as not in the current cluster membership list, then the third deduplication and compression service 543 (DC3) does not receive a new cluster membership message with the new generation identifier and will not be able to identify or generate the new secret access key. Since the secret access key has been updated on the object storage 580, any further input/output (I/O) commands made by the third deduplication and compression service 543 will result in a failure. The cluster services, such as the distributed log services 521, 522, and 523, and the distributed key value store services 531, 532, and 533 can also implement a similar secret access key-based authentication that may be used to fence off cluster services that are not in the current cluster membership list.

The cluster 500 utilizes the S3 authentication mechanism to fence off the input/output (I/O) commands from any nodes 501, 502, and 503 which are not in the new cluster membership list. The cluster 500 uses the generation identifier in the cluster membership message to generate the new secret access key that is used in Version 4 signing. The fencing may be applied to a smaller subset of resources or to a smaller subset of cluster services, such as generating a new secret access key for a similarity group identifier so that input/output (I/O) commands to other similarity groups are not impacted. If there is a change in the deduplication and compression service's membership, only the secret access key for this type of cluster service needs to be changed.

As an example of the interaction between the clustered services depicted in FIG. 5, the deduplication and compression service 541 requests file segments from an external source, receives the file segments compressed into compression regions, and stores the compression regions in the local post-deduplication log. When these compression regions for a file have been stored in the local post-deduplication log, the access object service 551 logs the file's new LO segments and sends the segments to the distributed key value store service 521 which stores the file's LP tree in a distributed key value store 580, rolls up the checksums for the file's LP tree, and verifies synchronization of the source and destination's LP trees by comparing their respective rolled up checksums. Based on a hash of the file handle or other information for the file being copied, the load balancer 572 can route traffic to one of the access object services 551 or 552, in a consistent manner so that future writes and/or reads of the same file would be routed consistently to the same access object service 551 or 552. This consistent routing by the load balancer 572 can enable the access object services 551 and 552 to cache state in memory that may be reused for recesses and avoids expensive locking by the distributed lock manager 561.

Figure 6:
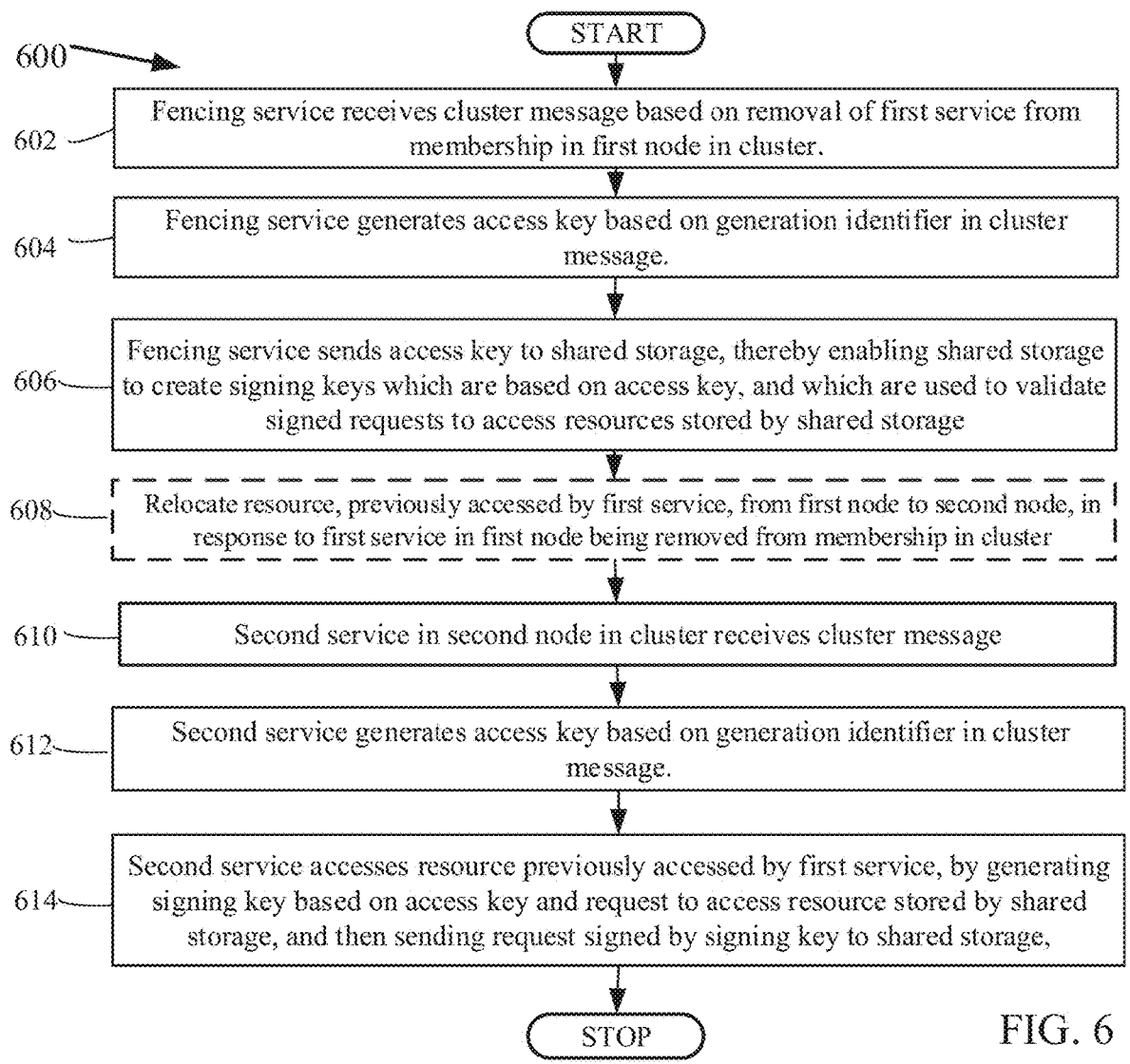
FIG. 6 is a block diagram illustrating an example method for fencing off cluster services based on access keys for shared storage, according to one or more embodiments of the disclosure.

FIG. 6 is a flowchart that illustrates a method for fencing off cluster services based on access keys for shared storage, under an embodiment. Flowchart 600 illustrates method acts illustrated as flowchart blocks for certain steps involved in the cluster 500, the nodes 501-503, the node services 511-573, and the shared storage 580 of FIG. 5. FIG. 6 depicts the flowchart 600 as a method for fencing off cluster services based on access keys for shared storage, with the method acts illustrated as flowchart blocks 602-614.

A fencing service receives a cluster message based on the removal of a first service from membership in a first node in a cluster, block 602. The system sends cluster membership messages to services that are communicating with the cluster. For example, and without limitation, this can include the fencing service 511 receiving a cluster membership message, which includes a generation identifier of "10", which is based on the cluster 500 losing communication with the deduplication and compression service 543.

A node can be a computer that manages access to a centralized resource in a network. A service can be a component that provides functions. A fencing service can be a component that provides functions to segregate a resource from a component that accessed the resource. A cluster message can be a communication associated with a set of connected computers that work together so that, in many respects, they are viewed as a single system. Membership can be the fact of being a part of a group. A removal can be the action of taking away a part of a group.

The cluster message may be sent only to services which have membership in a cluster. For example, the cluster 500 sends cluster membership messages only to the services which are still communicating within the cluster 500, such as the services executing in the nodes 501 and 502. The cluster message may be sent only to nodes which have membership in the cluster, with the cluster message being based on the removal of any node from membership in the cluster. For example, if the cluster membership message is generated based on the cluster 500 losing communication with the node 503, then the cluster membership service sends the cluster membership message only to nodes 501 and 502 which are still communicating with the cluster 500.

The cluster message may include a current list of member services and a previous list of member services, which the fencing service uses to identify the service that was removed from membership in the cluster, and enables the shared storage to create signing keys which are used to validate signed requests from the type of service to access resources stored by the shared storage. For example, the cluster membership message includes a current list of services, such as {aob1, dc1, aob2, dc2, dlm1, dlm2, aob3}, which are still communicating with the cluster 500 and a previous list of services, such as {aob1, dc1, aob2, dc2, dlm1, dlm2, aob3, dc3}, which were previously communicating with the cluster 500. The fencing service 511 can compare these lists to identify the service which lost communication with the cluster 500 was the deduplication and compression service 543, and instruct the object storage 580 to create signing keys to validate signed requests from the deduplication and compression services 541 and 542 to access the local post-deduplication log stored by the object storage 580, which had belonged to the deduplication and compression service 543, which lost communication with the cluster 500.

A current list can be a number of contemporary connected items presented consecutively. A member service can be a component which provides functions and is part of a group. A previous list can be a number of preceding connected items presented consecutively. A type can be a category of entities which have common characteristics. A signing key can be a digital entity that provides a means of authorization. A signed request can be an authorized instruction to a computer to provide information or perform another function. A resource can be a supply of assets that may be drawn upon to function effectively. A shared storage can be the retention in a computer of retrievable data constructs that that may be used by multiple entities in the computer. An object storage can be the retention in a computer of retrievable data constructs that that may be used by the computer.

A fencing service may identify a resource accessed by a service that was removed from membership in a cluster, and enable a shared storage to create signing keys that are used to validate signed requests from services to access the type of the resource stored by the shared storage. The system can fence off specific resources owned by services which are not communicating with the cluster. For example, the fencing service 511 creates a new secret access key for a range of similarity group identifiers stored by the object storage 580, so that requests to access other ranges of similarity group identifiers are not impacted.

After receiving a cluster message that includes a generation identifier, the fencing service generates an access key based on the generation identifier in the cluster message, block 604. The system uses a cluster membership message's generation identifier to create a new secret access key. By way of example and without limitation, this can include the fencing service 511 inputting the generation identifier of "10" into a password-based key derivation function to generate a new secret access key. An access key can be a digital entity that provides the means of obtaining or retrieving information stored in a computer's memory. A generation identifier can be a sequence of characters used to refer to an entity in a sequence.

Following the generation of an access key, a fencing service sends the access key to a shared storage, thereby enabling the shared storage to create signing keys that are based on the access key, and that are used to validate signed requests to access resources stored by the shared storage, block 606. The system creates new signing keys for fencing off cluster services that are not communicating with the cluster. In embodiments, this can include the fencing service 511 sending the new secret access key to the object storage 580, which uses the new secret access key to create the signing keys used to validate signed requests to access resources, such as the local post-deduplication log, which are stored by the object storage 580.

A resource may be a local fingerprint index, a namespace, a local post-deduplication log, or a range of similarity group identifiers, and the shared storage may be an object service, a distributed key value store, or a distributed log. For example, the deduplication and compression service 543 accessed a local post-deduplication log stored by the object storage 580. In another example, the distributed log service 521 stores LP segments in the distributed log 580. In yet another example, the distributed key value store service 532 stores a file's LP tree in the distributed key value store 580.

A local fingerprint index can be an ordered list of bit strings which were mapped from larger data objects or data files, which uniquely identify the larger data objects or data files, and which is only available for use in one part of a program. A namespace can be a set of identifiers that are used to refer to distinct types of objects while avoiding identifier collision between multiple objects that use the same identifier. A local post-deduplication log can be a record of information generated after the elimination of redundant information, and which is only available for use in one part of a program. A range of similarity group identifiers can be a set of numbers between lower and upper limits of a scale which refers to how much groups of data segments resemble other groups of data segments. A distributed log can be a record which is available for use in multiple parts of a system. A distributed key value store can be the retention in a computer of digital entities that enable the retrieval of data constructs that that may be used by multiple entities in the computer.

A resource, previously accessed by a first service, may be relocated from a first node to a second node, in response to the first service in a first node being removed from membership in a cluster, block 608. The system can relocate a resource from a node which lost communication with a cluster to a node which still communicates with the cluster. For example, and without limitation, this can include the cluster membership service relocating the local post-deduplication log from the node 503 which is not communicating with the cluster 500 to the node 501 which is still communicating with the cluster 500.

After a fencing service receives a cluster message, a second service in a second node in a cluster receives the cluster message, block 610. The system sends cluster membership messages to the remaining services after the fencing service has fenced off the services which are not communicating with the cluster. By way of example and without limitation, this can include the deduplication and compression service 541 in the node 501 receiving the cluster membership message.

Following receipt of a generation identifier in a cluster membership message, a second service in a second node in the cluster generates an access key based on the generation identifier, block 612. The system repeatedly uses a cluster membership message's generation identifier to create a new secret access key. In embodiments, this can include the deduplication and compression service 541 using the generation identifier of "10" to generate the new secret access key.

Having generated an access key, a second service accesses a resource previously accessed by a first service, by generating a signing key based on the access key and a request to access the resource stored by a shared storage, and then sending the request signed by the signing key to the shared storage, block 614. The system uses secret access keys for shared storage to fence off any cluster services which lost communication with the cluster. For example, and without limitation, this can include the deduplication and compression service 541 using the new secret access key and a request to access the local post-deduplication log to generate a signing key, using the signing key to sign the request, and sending the signed request to the object storage 580. Then the object storage 580 enables the deduplication and compression service 541 to access the local post-deduplication log which belonged to the deduplication and compression service 543 which lost communication with the cluster 500. A request can be an instruction to a computer to provide information or perform another function.

Although FIG. 6 depicts the blocks 602-614 occurring in a specific order, the blocks 602-614 may occur in other orders. In other implementations, each of the blocks 602-614 may also be executed concurrently and/or in combination with other blocks and/or some blocks may be divided into a distinct set of blocks.

Exemplary Computing System

Figure 7:
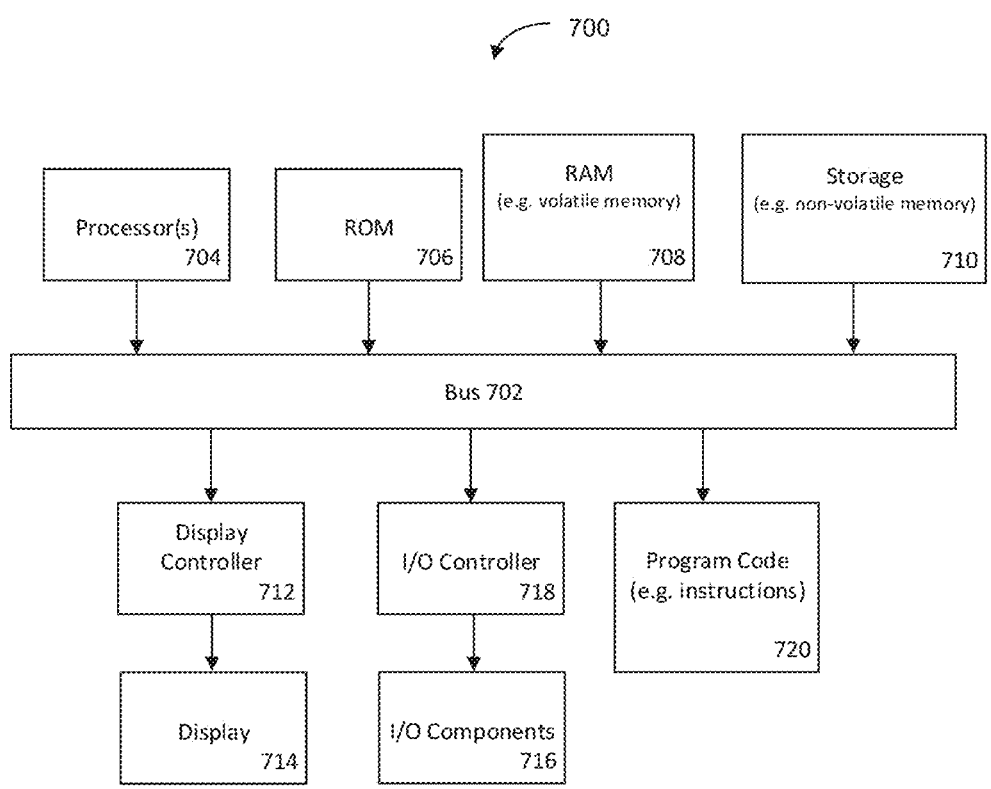
FIG. 7 is a block diagram illustrating a computing system for fencing off cluster services based on access keys for shared storage, according to one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 702 which may be coupled to a processor 704, ROM (Read Only Memory) 706, RAM (or volatile memory) 708, and storage (or non-volatile memory) 710. The processor(s) 704 may retrieve stored instructions from one or more of the memories 706, 708, and 710 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors.

Moreover, the one or more processors 704 may perform operations in an on-demand or "cloud computing" environment or as a service, such as within a "software as a service" (SaaS) implementation. Accordingly, the performance of operations may be distributed among the one or more processors 704, whether residing only within a single machine or deployed across a number of machines. For example, the one or more processors 704 may be located in a single geographic location (such as within a home environment, an office environment, or a server farm), or may be distributed across a number of geographic locations.

The RAM 708 may be implemented as, for example, dynamic RAM (DRAM), or other types of memory that require power continually in order to refresh or maintain the data in the memory. Storage 710 may include, for example, magnetic, semiconductor, tape, optical, removable, non-removable, and other types of storage that maintain data even after power is removed from the system. It should be appreciated that storage 710 may be remote from the system, such as accessible via a network.

A display controller 712 may be coupled to the bus 702 in order to receive display data to be displayed on a display device 714, which can display any one of the user interface features or embodiments described herein and may be a local or a remote display device. The computing system 700 may also include one or more input/output (I/O) components 716 including mice, keyboards, touch screen, network interfaces, printers, speakers, and other devices. Typically, the input/output components 716 are coupled to the system through an input/output controller 718.

Program code 720 may represent any of the instructions, applications, software, libraries, toolkits, modules, components, engines, units, functions, logic, etc. as described herein. Program code 720 may reside, completely or at least partially, within the memories described herein (such as non-transitory computer-readable media), or within a processor during execution thereof by the computing system. Program code 720 may include both machine code, such as produced by a compiler, and files containing higher-level or intermediate code that may be executed by a computing system or other data processing apparatus (or machine) using an interpreter. In addition, program code 720 may be implemented as software, firmware, or functional circuitry within the computing system, or as combinations thereof. Program code 720 may also be downloaded, in whole or in part, through the use of a software development kit or toolkit that enables the creation and implementation of the described embodiments.

Moreover, any of the disclosed embodiments may be embodied in distinct types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for fencing off cluster services using access keys for shared storage comprising:
   one or more processors; and
   a non-transitory computer readable medium storing a plurality of instructions, which when executed, cause the one or more processors to:
   generate, by a fencing service, an access key using a generation identifier included in a cluster membership message, in response to receiving the cluster membership message upon removal of a first service from membership in a first node in a cluster;
   send, by the fencing service, the access key to a shared storage, thereby enabling the shared storage to create signing keys which are generated using the access key, and which are used to validate signed requests to access resources stored by the shared storage;
   generate, by a second service in a second node in the cluster of nodes, the access key using the generation identifier, in response to receiving the cluster message;
   access, by the second service, a resource previously accessed by the first service, by generating a signing key using the access key and a request to access the resource stored by the shared storage, and then sending the request signed by the signing key to the shared storage; and
   wherein the fencing service identifies the resource accessed by the first service which was removed from membership in the cluster, and enables the shared storage to create signing keys which are used to validate signed requests from services to access a type of the resource stored by the shared storage.

2. The system of claim 1, wherein the cluster message is sent only to services which have membership in the cluster.

3. The system of claim 1, wherein the cluster message is sent only to nodes which have membership in the cluster, the cluster message being based on a removal of any node from membership in the cluster.

4. The system of claim 1, wherein the resource comprises one of a local fingerprint index, a namespace, a local post-deduplication log, and a range of similarity group identifiers, and the shared storage comprises one of an object service, a distributed key value store, and a distributed log.

5. The system of claim 1, wherein the plurality of instructions further causes the processor to relocate the resource, previously accessed by the first service, from the first node to the second node, in response to the first service in the first node being removed from membership in the cluster.

6. The system of claim 1, wherein the cluster message further comprises a current list of member services and a previous list of member services, which the fencing service uses to identify the first service which was removed from membership in the cluster, and enables the shared storage to create signing keys which are used to validate signed requests from the type of the first service to access resources stored by the shared storage.

7. A computer program product comprising a non-transitory computer-readable medium having a computer-readable program code embodied therein to be executed by one or more processors, the program code including instructions to:
   generate, by a fencing service, an access key using a generation identifier included in a cluster membership message, in response to receiving the cluster message upon removal of a first service from membership in a first node in a cluster;
   send, by the fencing service, the access key to a shared storage, thereby enabling the shared storage to create signing keys which are generated using the access key, and which are used to validate signed requests to access resources stored by the shared storage;
   generate, by a second service in a second node in the cluster, the access key using the generation identifier, in response to receiving the cluster message; and
   access, by the second service, a resource previously accessed by the first service, by generating a signing key using the access key and a request to access the resource stored by the shared storage, and then sending the request signed by the signing key to the shared storage; and
   wherein the fencing service identifies a type of the resource accessed by the first service which was removed from membership in the cluster, and enables the shared storage to create signing keys which are used to validate signed requests from services to access the type of the resource stored by the shared storage.

8. The computer program product of claim 7, wherein the cluster message is sent only to services which have membership in the cluster.

9. The computer program product of claim 7, wherein the cluster message is sent only to nodes which have membership in the cluster, the cluster message being based on a removal of any node from membership in the cluster.

10. The computer program product of claim 7, wherein the resource comprises one of a local fingerprint index, a namespace, a local post-deduplication log, and a range of similarity group identifiers, and the shared storage comprises one of an object service, a distributed key value store, and a distributed log.

11. The computer program product of claim 7, wherein the program code includes further instructions to relocate the resource, previously accessed by the first service, from the first node to the second node, in response to the first service in the first node being removed from membership in the cluster.

12. The computer program product of claim 7, wherein the cluster message further comprises a current list of member services and a previous list of member services, which the fencing service uses to identify the first service which was removed from membership in the cluster, and enables the shared storage to create signing keys which are used to validate signed requests from the type of the first service to access resources stored by the shared storage.

13. A computer-implemented method for fencing off cluster services based on access keys for shared storage, comprising:
    generating, by a fencing service, an access key using a generation identifier included in a cluster membership message, in response to receiving the cluster message upon a removal of a first service from membership in a first node in a cluster;
    sending, by the fencing service, the access key to a shared storage, thereby enabling the shared storage to create signing keys which are generated using the access key, and which are used to validate signed requests to access resources stored by the shared storage;
    generating, by a second service in a second node in the cluster, the access key using the generation identifier, in response to receiving the cluster message; and
    accessing, by the second service, a resource previously accessed by the first service, by generating a signing key using the access key and a request to access the resource stored by the shared storage, and then sending the request signed by the signing key to the shared storage; and
    wherein the fencing service identifies a type of the resource accessed by the first service which was removed from membership in the cluster, and enables the shared storage to create signing keys which are used to validate signed requests from services to access the type of the resource stored by the shared storage.

14. The computer-implemented method of claim 13, wherein the cluster message is sent only to services which have membership in the cluster.

15. The computer-implemented method of claim 13, wherein the cluster message is sent only to nodes which have membership in the cluster, the cluster message being based on a removal of any node from membership in the cluster, and the resource comprises one of a local fingerprint index, a namespace, a local post-deduplication log, and a range of similarity group identifiers, and the shared storage comprises one of an object service, a distributed key value store, and a distributed log.

16. The computer-implemented method of claim 13, wherein the computer-implemented method further comprises relocating the resource, previously accessed by the first service, from the first node to the second node, in response to the first service in the first node being removed from membership in the cluster.

17. The computer-implemented method of claim 13, wherein the cluster message further comprises a current list of member services and a previous list of member services, which the fencing service uses to identify the first service which was removed from membership in the cluster, and enables the shared storage to create signing keys which are used to validate signed requests from the type of the first service to access resources stored by the shared storage.

* * * * *